(12) United States Patent
Zhang et al.

(10) Patent No.: US 9,377,166 B2
(45) Date of Patent: Jun. 28, 2016

(54) LENS, LED MODULE AND ILLUMINATION SYSTEM HAVING SAME

(71) Applicant: Wanjiong Lin, Ningbo (CN)

(72) Inventors: Fawei Zhang, Ningbo (CN); Wanjiong Lin, Ningbo (CN)

(73) Assignee: Self Electronics Co., Ltd., Ningbo (CN)

( * ) Notice: Subject to any disclaimer, the term of this patent is extended or adjusted under 35 U.S.C. 154(b) by 27 days.

(21) Appl. No.: 14/517,174

(22) Filed: Oct. 17, 2014

(65) Prior Publication Data

US 2015/0124459 A1    May 7, 2015

(30) Foreign Application Priority Data

Nov. 5, 2013  (CN) .......................... 2013 1 0552879

(51) Int. Cl.
| | |
|---|---|
| *F21K 99/00* | (2016.01) |
| *G02B 19/00* | (2006.01) |
| *F21V 5/00* | (2015.01) |
| *F21V 7/00* | (2006.01) |
| *F21V 5/04* | (2006.01) |

(52) U.S. Cl.
CPC ... *F21K 9/50* (2013.01); *F21V 5/00* (2013.01); *F21V 5/04* (2013.01); *F21V 7/00* (2013.01); *F21V 7/0091* (2013.01); *G02B 19/0028* (2013.01); *G02B 19/0066* (2013.01)

(58) Field of Classification Search
CPC ............... F21K 9/50; F21V 5/00; F21V 7/00; F21V 7/0091
See application file for complete search history.

(56) References Cited

U.S. PATENT DOCUMENTS

| | | | | |
|---|---|---|---|---|
| 2,064,252 | A | * 12/1936 | Fortney | ................. F21S 48/145 313/110 |
| 2014/0112003 | A1 | * 4/2014 | Lacroix | ..................... F21V 5/04 362/329 |

* cited by examiner

*Primary Examiner* — Anabel Ton
(74) *Attorney, Agent, or Firm* — Wang Law Firm, Inc.

(57) ABSTRACT

A lens, LED module and an illumination system includes an illuminated area; and at least an LED module for illuminating the illuminated area. The LED module includes an LED, and a lens mounted in the light path of the LED. The lens includes an optical axis, a light source recess arranged through the optical axis, a light emitting surface crossing through the optical axis, and a critical reflection surface arranged between the light source recess and the light emitting surface, wherein the light source recess is a rectangular hole in a section view which is vertical to the optical axis and has a center axis which overlaps with the optical axis, the light source recess has a wedge-shaped hole in a section view along the optical axis, the wedge-shaped hole has a top wall which crosses through the optical axis, the top wall has a convex surface.

13 Claims, 7 Drawing Sheets

LENS, LED MODULE AND ILLUMINATION SYSTEM HAVING SAME

RELATED APPLICATION

This application claims benefit of the Chinese Application, CN201310552878.1, filed on Nov. 5, 2013, the entire specification of which is hereby incorporated by reference.

BACKGROUND

1. Technical Field

The disclosure relates to a lighting devices, and more particularly to a lens, LED module and illumination system having same.

2. Description of the Related Art

For years, people have used traditional incandescent or fluorescence lighting apparatus in order to address their interior lighting concerns. However, such lighting apparatus presents a number of drawbacks. For example, the popular halogen apparatus presents the following drawbacks, such as relatively high power consumption, inefficiency of light dispersion due to the placement of its metal shield in the line sight of the halogen bulb, and its limited effectiveness in preventing glare from the halogen bulb.

Recently, a number of LED lighting apparatuses have been designed to replace the halogen apparatus, as well as other traditional incandescent or fluorescence lighting apparatuses. But, due to mediocre light output, LED used in the past was primarily limited to applications where only small surface areas were illuminated. In these applications the light was concentrated into a narrow beam using an optic designed to take the wide angle light output of an LED and collimate it using a lens, discussed below with respect to FIG. 7. FIG. 7 shows a traditional light illumination system. The light illumination system includes an illuminated area 1, and an LED light module 2 positioned beside the illuminated area 1. The LED light module 2 has a light emitting surface 3, and light 4 emitted forward of the light emitting surface 3 illuminate the illuminated area 1. Understandably, regardless of where the LED light module is disposed with relationship of the illuminated area 1, part of the light 4 illuminates the illuminated area 1 which is closer to the LED light module 2 and the other illuminates the illuminated area 1 which is farther to the LED light module 2. Since the performance of the above illumination is inevitable, part of the light 4, which illuminates the illuminate area 1 and is farther to the LED light module 2, has more attenuation than the other which illuminates the illuminate area 1 and is closer to the LED light module 2. However, the light 4 emitted from the light emitting surface 3 has same initial light intensity. As a result, the illumination value of the illuminated area 1 varies with the distance between the illumination area 1 and the LED light module 2. Examples of some applications of the light illumination system include exhibition hall, showcase, and so on. These new applications require different optical designs. In particular these applications require uniform illumination in the illumination area 1 for improving the sense of quality of the showed products to people.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

FIG. 6 is a plan view of the lens of FIG. 3.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
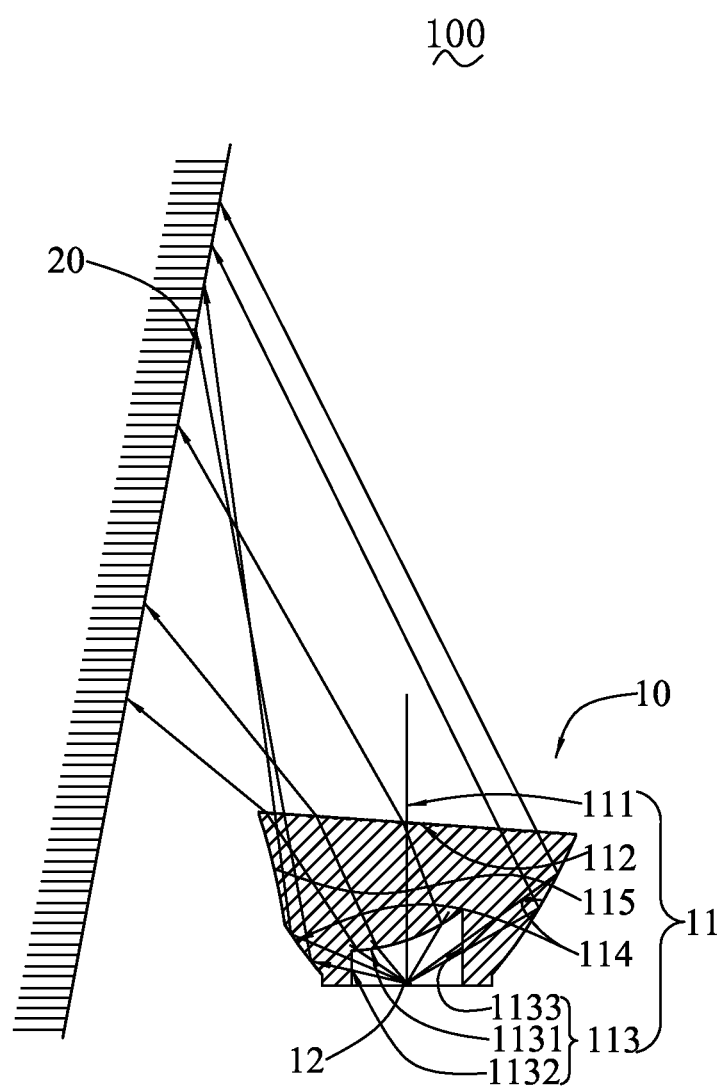
FIG. 1 is a light path view and a schematic view of an illumination system in accordance with one embodiment of the disclosure.
Figure 2:
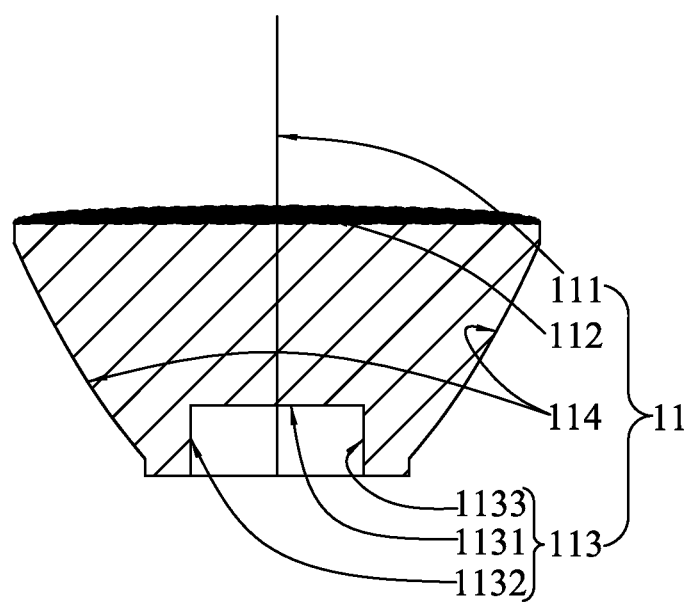
FIG. 2 is one section view of a lens of the illumination system of FIG. 1 taken along an optical axis of the lens.
Figure 3:
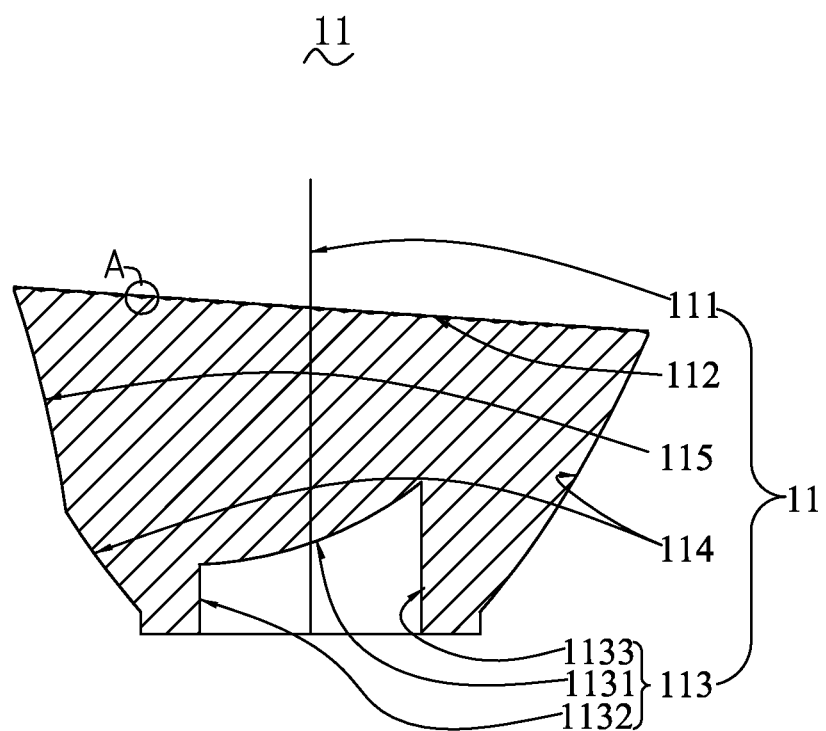
FIG. 3 is another section view of the lens of the illumination system of FIG. 1 taken along the optical axis of the lens.

Referring to FIG. 1 to FIG. 3, an illumination system 100 according to an embodiment is shown. The illumination system 100 includes at least an LED module 10, and at least an illumination area 20 illuminated by the LED module 10. In actual applications, there may be many LED modules 10 which are determined by the quantity and the area of the illumination area 20. In the present embodiment, only for purposes of illustration, one LED module 10 and one illuminated area 20 are shown as example. Understandably, the illumination system 100 includes other components, such as house, base for mounting the LED module 10, cover, and power source for providing power to the LED module 10, and so on, but which need not be explained for a person skilled in the art.

The LED module 10 includes an LED 12, and a lens 11 arranged on light path of the LED 12. Referring to FIG. 2 and FIG. 3, the lens 11 includes an optical axis 111, a light emitting surface 112 crossing through the optical axis 111, a light source recess 113 arranged through the optical axis 111, and a critical reflection surface arranged between the light source recess 113 and the light emitting surface 112.

The optical axis 111 is a universal feature for all of lens and used to dispose the light source, namely the LED 12. Moreover, the optical axis 111 is a guide for optic design.

Figure 4A:
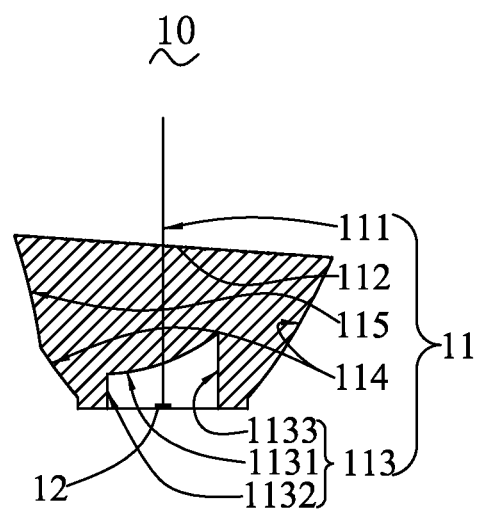
FIG. 4A and FIG. 4B are section view of two different LED modules of the illumination system of FIG. 1.
Figure 5:
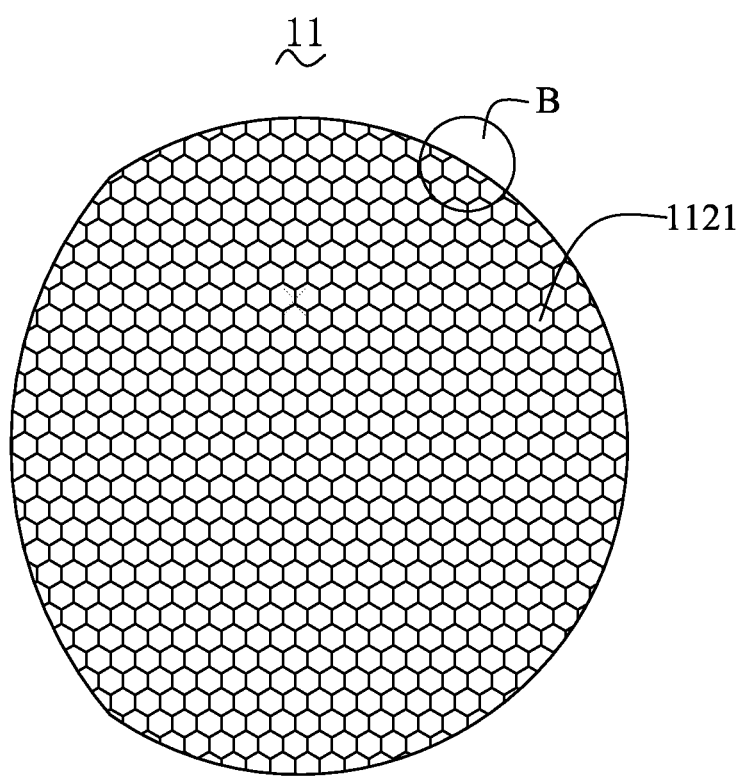
FIG. 5 is a bottom view of the lens of FIG. 3.
Figure 6A:
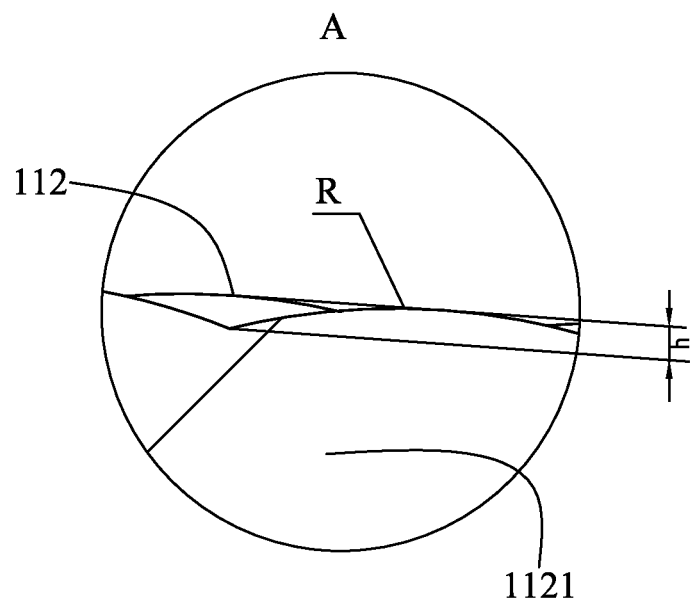
FIG. 6A and FIG. 6B is a partially enlarged views of the lens of FIG. 4A at A and the lens of FIG. 5 at B.
Figure 6B:
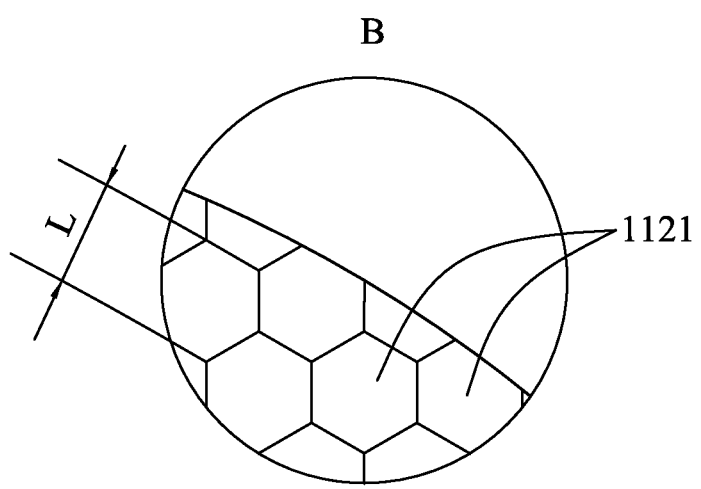
Figure 7:
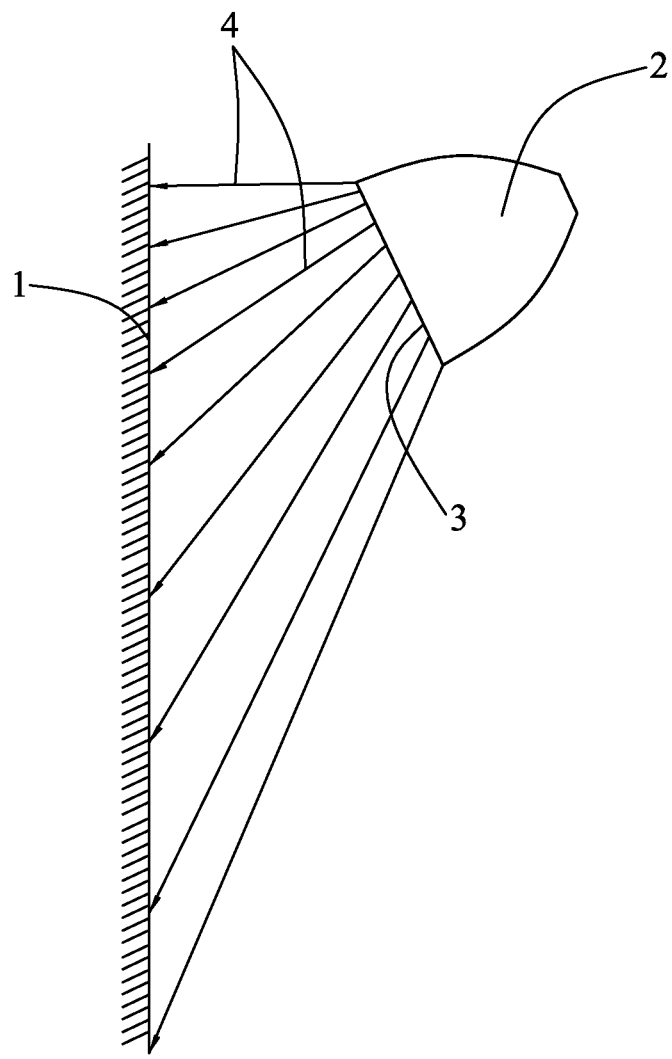
FIG. 7 is a light path view of a traditional illumination system in prior art.

The light emitting surface 112 is configured for emitting all of line sight of the lens 11 therefrom which illuminate the illumination area 20. In order to control the beam width of the light emitted forward of the LED 12 so as to form controlled illumination pattern on the illumination area 20, a plurality of convex lenses 1121 are formed in the radial direction as shown in FIG. 5 and in the circumferential direction around the LED 12 which is provided at the center thereof. As shown in FIG. 6A, which is a partially enlarged view of FIG. 4A at A, it shows a radius R and a height h of the convex lenses 116. FIG. 6B, which is a partially enlarged view of FIG. 5 at B, shows as hexagonal shaped regions having a lateral dimensional L. The convex lenses 1121 have the radius R, the height h, and the lateral dimensional L which are designed according to beam wide of incident light. According to embodiments of the present invention, the convex lenses 1121 can be made to provide different beam widths by varying the parameters such as R, h, and L. For example, in one embodiment, a configuration with R=3.0 mm, h=0.1 mm, L=1.33 mm is used for a narrow beam having a beam width of about 12-17 degrees; R=2.0 mm, h=0.55 mm, and L=3.0 mm is used for a wide beam having a beam width of about 25-30 degrees. Understandably, the convex lenses 1121 may be not formed on the first light emitting surface 112. In a section view taken along the optical axis 111, an angle between the light emitting surface 112 and the optical axis 111 is not equal to 90 degree, namely is greater than or less than 90 degree so as to shoot the emitting light of the light emitting surface onto the illuminated area 20 which is farther to the LED module 10. Specifically, the light emitting surface is inclined and revolves about the optical axis 111 clockwise in the section view taken along the optical axis 111.

Figure 4B:
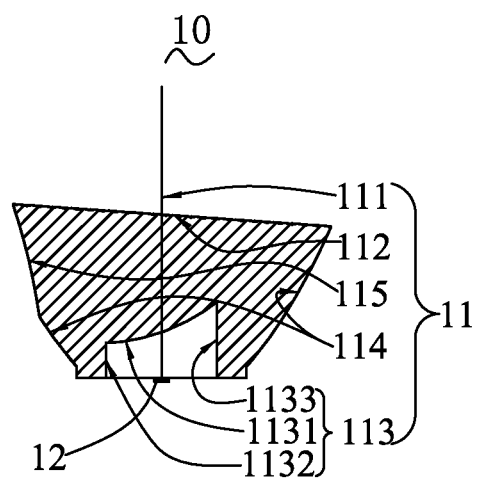

Referring to FIG. 2 and FIG. 3, the light source recess 113 is configured for mounting the light source, such as the LED 12 or other traditional light source. In the present embodiment, the light source is the LED 12. When dimension scale between the lens 11 and the light source is same as that between the lens 11 and the LED 12, the light source may be other traditional light source, such as incandescent or fluorescence lighting apparatuses, and so on. As shown in FIG. 4A and FIG. 4B, the LED 12 may be mounted into the light source recess 111 or at outer side of the light source recess 111. When the LED 12 is disposed into the light source recess 111, a bottom side of the LED 12 is flush with an end of the light source recess 111 for sufficiently taking advantage of the light emitted forward of the LED 12 and ease to assemble the lens 11 and the LED 12. When the LED 12 is mounted at outer side of the light source recess 111, a light emitting side of the LED 12 is flush with the end of the light source recess 111 for sufficiently taking advantage of the light emitted forward of the LED 12. In the present embodiment, the bottom side of the LED 12 is flush with the end of the light source recess 111. In the bottom view of the lens 11 of FIG. 4, the light source recess 113 is a rectangular opening in a section view which is vertical to the optical axis 111 and has a center axis which overlaps with the optical axis 111. In the section view taken along the optical axis 111, the light source recess has a wedge-shaped opening. The wedge-shaped opening includes a top wall 1131, a short edge sidewall 1132 positioned on one side of the top wall 1131, and a long edge sidewall 1133 positioned on another side of the top wall 1132. The optical axis 111 crosses through the top wall 1131 and may parallel with the short edge sidewall 1132 and the long edge sidewall 1133. The top wall 1131 has a convex surface for optical design. As shown in FIG. 3, the convex surface has a positive curvature along the direction of emergent light of the lens 11. The light received by the top wall 1131 shot onto the light emitting surface 112 and emits out of the lens 11.

The critical reflection surface 114 is configured for receiving the light emitted forward of the short edge sidewall 1132 and the long edge sidewall 1133 and reflecting the received light into the light emitting surface 112. In the section view taken along the optical axis 111, one end of the outline of the critical reflection surface 114 is connected to the light emitting surface 112, the other is connected to the short edge sidewall 1132 and the long edge sidewall 1133 respectively.

In order to optimize the structure design of the lens 11, the lens is cut off a gap 115 in side of the short edge sidewall 1132. As a result of optical design of the convex surface of the top wall 1131, the light emitted forward of the short edge sidewall 1132 cannot shot onto the gap 115. Therefore, the lens 11 is cut a block, which forms the gap 115, so as to further reduce the volume thereof.

The LED 12 is a semiconductor light source and transforms power into light. The LED 12 presents many advantages over traditional light sources including lower energy consumption, longer lifetime, improved physical robustness, smaller size, and faster switching. A center of the LED 12 is arranged on the optical axis 111 of the lens 11 for ease to optic design.

The illuminated area 20 is an object illuminated by the LED module 10 and may be a plan or a curve. In the present embodiment, only for explaining the configuration and principle of the disclosure as a example, the illuminated area 20 is a plan and may be a picture exhibited in museum or selling goods placing in the freezer of supermarket, and so on. As shown in FIG. 1, when assembling the LED module 10, the illuminated area 20 is positioned beside the short edge sidewall 1132. In the section view taken along the optical axis 111, the angle between the illuminated area 20 and the optical axis 111 is greater than 0 degree and less than 20 degree.

In use, the light emitted forward of the LED 12 is divided into two beams. One beam is received by the short edge sidewall 1132 and the long edge sidewall 1133 and shot towards the light emitting surface 112 after refracted by the light emitting surface 112 and illuminate the illuminated area 20 which is farther to the LED module 10. The other is received by the top wall 1131 is spreaded and illuminate the whole illuminated area 20 after refracted by the light emitting surface 112. Needed to further describe, the emergent light from the short edge sidewall 1132 and the long edge sidewall 1133, which illuminate the illuminated area 20 which is farther to the LED module 10, not convergent into a point and form a spot in the illuminated area 20. The spot size is determined by the parameter of the LED 12 and the lens 11. Since the wedge-shaped opening of the light source recess 113 distributes the light from the LED 12, that is to say, the convex surface of the top wall 1131 spreads the received light onto the whole illuminated area 20 and the short edge sidewall 1132 and the long edge sidewall 1133 refract the received light onto the illuminated area 20 which is father to the LED module 10 after reflected by the critical reflection surface 114, the illuminated area 20 which is father to the LED module 10 may receive more light quantity than the illuminated area 20 which is closer to the LED module 10. In result, although the light shot onto the illuminated area 20 which is father to the LED module 10 may have greater attenuation than the light the illuminated area 20 which is closer to the LED module 10, light shot onto the illuminated area 20 which is father to the LED module 10, can make up the intensity losses of attenuation as the illuminated area 20 which is father to the LED module 10 receives more light quantity than the illuminated area 20 which is closer to the LED module 10. As a result, the illumination pattern which is closer to the LED module 10 has basically same luminance with the illumination pattern which is father to the LED module 10. That is to say, the illumination system 100 have uniform illumination pattern. Here, "basically" means that when illuminace values measured by an illuminance meter at two sides of the illumination area 20, which is father to and close to the LED module 10, are not absolutely equal. But it is difficult to distinguish for people to observe via naked eyes, therefore, the illuminated area 20 has a uniform illumination pattern for naked eye vision.

While the disclosure has been described by way of example and in terms of exemplary embodiment, it is to be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens comprising:
   an optical axis;
   a light source recess arranged through the optical axis;
   a light emitting surface crossing through the optical axis; and
   a critical reflection surface arranged between the light source recess and the light emitting surface, wherein the light source recess is a rectangular opening in a section view which crosses through the optical axis and has a center axis which overlaps with the optical axis, the light source recess has a wedge-shaped opening in a section view along the optical axis, the wedge-shaped hole has a top wall which crosses through the optical axis, the top wall has a convex surface, the section view where the rectangular opening is in is perpendicular to that where the wedge-shaped opening is in.

2. The lens of claim 1, wherein the angle between the light emitting surface and the optical axis in the section view along the optical axis is greater or less than 90 degree.

3. The lens of claim 2, wherein the light emitting surface is inclined and revolves about the optical axis in the section view along the optical axis.

4. The lens of claim 1, wherein the light emitting surface has a plurality of convex lenses disposed thereon, each of the convex lenses has a radius, a height and a lateral dimensional which are designed according to beam wide of incident light.

5. The lens of claim 1, wherein the wedge-shaped opening further comprises a short edge sidewall located on one side of the top wall, and a long edge sidewall located on other side of the top wall.

6. The lens of claim 1, wherein the convex surface has a positive curvature along the direction of emergent light of the lens.

7. An LED module comprising:
   an LED; and
   a lens mounted in the light path of the LED, the lens comprising:
     an optical axis;
     a light source recess arranged through the optical axis;
     a light emitting surface crossing through the optical axis; and
     a critical reflection surface arranged between the light source recess and the light emitting surface, wherein the light source recess is a rectangular opening in a section view which crosses through the optical axis and has a center axis which overlaps with the optical axis, the light source recess has a wedge-shaped opening in a section view along the optical axis, the wedge-shaped opening has a top wall which crosses through the optical axis, the top wall has a convex surface, the section view where the rectangular opening is in is perpendicular to that where the wedge-shaped opening is in.

8. The LED module of claim 7, wherein the convex surface has a positive curvature along the direction of emergent light of the lens.

9. An illumination system comprising:
   an illuminated area; and
   at least an LED module for illuminating the illuminated area, the LED module comprising:
     an LED; and
     a lens mounted in the light path of the LED, the lens comprising:
       an optical axis;
       a light source recess arranged through the optical axis;
       a light emitting surface crossing through the optical axis; and
       a critical reflection surface arranged between the light source recess and the light emitting surface, wherein the light source recess is a rectangular opening in a section view which crosses through the optical axis and has a center axis which overlaps with the optical axis, the light source recess has a wedge-shaped opening in a section view along the optical axis, the wedge-shaped opening has a top wall which crosses through the optical axis, the top wall has a convex surface, the section view where the rectangular opening is in is perpendicular to that where the wedge-shaped opening is in.

10. The illumination system of claim 9, wherein the convex surface has a positive curvature along the direction of emergent light of the lens.

11. The illumination system of claim 9, wherein the angle between the illuminated area and the optical axis is greater than 0 degree and less than 20 degree in the section view along the optical axis.

12. The illumination system of claim 9, wherein the wedge-shaped opening further comprises a short edge sidewall located on one side of the top wall, and a long edge sidewall located on other side of the top wall.

13. The illumination system of claim 12, wherein the illuminated area is arranged on either side of the short edge sidewall.

* * * * *